(12) United States Patent
Graham

(10) Patent No.: US 6,760,019 B1
(45) Date of Patent: Jul. 6, 2004

(54) METHODS AND APPARATUS FOR FACILITATING THE SHARING OF COMPUTER GRAPHICS OPERATIONS

(75) Inventor: James Graham, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 329 days.

(21) Appl. No.: 09/585,369

(22) Filed: Jun. 1, 2000

(51) Int. Cl.[7] ............................ G06F 17/00; G06T 1/00
(52) U.S. Cl. ........................ 345/418; 345/581; 345/601; 345/501; 345/552
(58) Field of Search ............................ 345/418–420, 345/422, 428, 581, 427, 586–589, 596, 601–602, 606, 611, 612–614, 619, 621, 630, 651, 713, 717, 764, 854, 855, 501, 522, 536, 537–538, 548–549, 552, 556, 541, 565; 717/100, 165, 116, 168, 120, 172, 127, 177, 114

(56) References Cited

U.S. PATENT DOCUMENTS

| | | | |
|---|---|---|---|
| 5,291,583 A | * | 3/1994 | Bapat ........................ 717/137 |
| 5,335,320 A | | 8/1994 | Iwata et al. |
| 5,384,911 A | | 1/1995 | Bloomfield |
| 5,394,523 A | | 2/1995 | Harris |
| 5,471,568 A | | 11/1995 | Webb et al. |
| 5,644,764 A | * | 7/1997 | Johnson et al. ......... 707/103 R |
| 5,671,398 A | * | 9/1997 | Neubauer .................... 703/23 |
| 5,701,472 A | * | 12/1997 | Koerber et al. ............ 707/203 |
| 5,764,228 A | * | 6/1998 | Baldwin .................... 345/501 |
| 5,852,443 A | * | 12/1998 | Kenworthy ................ 345/583 |
| 6,011,540 A | | 1/2000 | Berlin et al. |
| 6,025,826 A | | 2/2000 | Hung et al. |
| 6,034,694 A | * | 3/2000 | Evans et al. ............... 345/433 |
| 6,061,520 A | | 5/2000 | Yellin et al. |
| 6,064,408 A | | 5/2000 | Furlani et al. |
| 6,172,596 B1 | * | 1/2001 | Cesar et al. ............. 340/10.41 |
| 6,345,387 B1 | * | 2/2002 | Morrison .................... 717/11 |
| 6,381,600 B1 | * | 4/2002 | Lau .............................. 707/6 |
| 6,401,100 B1 | * | 6/2002 | Gladieux ............... 707/103 R |
| 6,502,098 B2 | * | 12/2002 | Lau .......................... 707/100 |

FOREIGN PATENT DOCUMENTS

WO     WO 00/04436     1/2000

* cited by examiner

*Primary Examiner*—Matthew C. Bella
*Assistant Examiner*—Wesner Sajous
(74) *Attorney, Agent, or Firm*—Martine & Penilla, LLP (57) ABSTRACT

Methods and apparatus for facilitating the sharing of graphics rendering operation implementations between different pixel formats. A lookup table is generated that stores the descriptions of the various rendering operation implementations. A plurality of chains of inherited object descriptors allows traversal from specific to more general descriptions of pixel formats and composition operations. Using these chains, the lookup table can be searched for a rendering operation implementation that best matches the specified criteria.

32 Claims, 7 Drawing Sheets

METHODS AND APPARATUS FOR FACILITATING THE SHARING OF COMPUTER GRAPHICS OPERATIONS

BACKGROUND OF THE INVENTION

1. Technical Field

The present invention generally relates to object oriented computer graphics and imaging. More specifically, the present invention relates to methods and apparatus for facilitating the sharing of computer graphics operations in an object oriented computer system.

2. Background Information

The proliferation of computers, and particularly in conjunction with the explosion of computer software and the Internet, has led to a rise in the complexity and variety of computer software applications. A prominent feature of many software applications is the ability to display and manipulate computer graphic images. Given the variety and number of different software applications, computer graphic images can vary a great deal and are often stored in a wide variety of pixel formats. As a result, computer software applications need to support many different pixel formats and many different graphics or rendering operations.

Computer graphic images may be stored in many different pixels formats such as 32-bit integer RGB (Red-Green-Blue) values or 32-bit BGR integer (Blue-Green-Red) values. Presently known systems typically customize their computer graphics rendering operations (e.g., DrawLine, FillRect, etc.) for each specific pixel format. This is necessary as the same implementation of a particular rendering operation may not work on different pixel formats. For example, the implementation of FillRect (i.e., fill a rectangle with specific attributes such as color, shade pattern, etc.) for a 32-bit integer RGB pixel format would not work for a 1-bit black and white (B/W) pixel format.

However, an implementation of a particular rendering operation may be shared in certain instances. For example, the FillRect implementation for a 32-bit integer RGB pixel format may be shared by the FillRect implementation for a 32-bit integer BGR pixel format as both implementations use a 32-bit integer value to generate the fill value for the rectangle. However, presently known systems are limited in their ability to recognize when an implementation of a particular rendering operation may be shared, as there is no implicit detection of the similarity between pixel formats. The computer software has to have source code that identifies the two pixel formats and the particular rendering operation, whereupon "hard-coded" logic directs the sharing of the rendering operation implementation between the two pixel formats.

Alternatively, the "hard-coded" logic could be omitted, and instead the implementation of the common rendering operations for the different pixel formats could be duplicated for each pixel format. However, this necessarily leads to software that is complex and more apt to have "bugs", and thus is more expensive to maintain and enhance, as bug fixes and enhancements have to be duplicated for the different implementations of the rendering operations. In addition, duplicating the rendering operations produces larger software executables which require more disk space and memory in order to function properly.

One popular approach to identifying pixel formats is that taken by platform independent application programming interfaces (APIs) such as OpenGL and QuickDraw 3D. These APIs provide a robust set of platform independent graphics primitives for various rendering operations from drawing lines, polylines, and polygons, to Gouraud and flat shading and the like. However, these APIs are limited in their ability to share implementations of common rendering operations among different pixel formats as the descriptors for the pixel formats are constants and do not support inheritance to derived or related pixel formats. Thus, these APIs must use hard-coded logic in order to share implementations of rendering operations for different pixel formats.

SUMMARY OF THE INVENTION

The present invention provides methods and apparatus for facilitating the sharing of implementations of rendering operations among different pixel formats. In accordance with one aspect of the present invention, a lookup table is generated having a plurality of software algorithm implementation descriptions. Each description may correspond to a rendering operation implementation or other type of software algorithm implementation. Each description comprises at least one attribute and may have a plurality of attributes such as a rendering operation type, a destination drawing surface data type, a source drawing surface data type, and a composition algorithm type. In addition, chains of a plurality of objects that are linked together are also generated. The objects can be implemented as C++ or Java objects having attributes and methods. The chains may comprise a chain of surface objects representing source or destination drawing surfaces. The chains may also comprise a chain of composition objects. Within each chain, the objects are linked together so that the supertype for a particular object can be easily accessed.

In accordance with another aspect of the present invention, the lookup table may be searched for a particular combination of attributes. The combination of attributes may comprise a specific rendering operation type and a specific destination drawing surface data type. If the specific combination of attributes is not found in the lookup table, then the chain of destination drawing surface objects may be traversed to find a supertype or more general description for the specified destination drawing surface data type. The lookup table may now be searched with the new combination of the specific rendering operation type and the supertype or more general destination drawing surface data type. This process can be repeated until a match is found or the chain of surface objects is fully traversed.

In accordance with another aspect of the present invention, the lookup table may be searched for a combination of attributes that includes a rendering operation type, a destination drawing surface data type, a source drawing surface data type, and a composition algorithm type. Linked chains of objects may be generated where the objects represent destination drawing surfaces, source drawing surfaces, and composition algorithms. If a match is not found in the lookup table for a specified combination of attributes, then the linked chains of objects may be traversed to obtain a supertype or more general description for one of the attributes. The lookup table can be searched again by substituting the supertype for one of the attributes. In this way, the lookup table can be iteratively searched until a match is found or the linked chains of objects are fully traversed.

BRIEF DESCRIPTION OF THE DRAWINGS

A more complete understanding of the present invention may be derived by referring to the detailed description when

DETAILED DESCRIPTION

The present invention may be described herein in terms of functional block components and processing steps. It should be appreciated that such functional blocks may be realized by any number of hardware components configured to perform the specified functions. For example, the present invention may be implemented by various integrated circuit components, e.g., memory elements, logic elements, lookup tables, and the like, which may be used to carry out a variety of functions under the control of one or more microprocessors or other control devices. In addition, those skilled in the art will appreciate that the present invention may be realized in a software or computer program context in conjunction with any number of conventional computer system environments. Furthermore, the present invention is not limited to the process flows described herein, as any process flow or rearrangement of process steps which captures the features of the present invention is considered to be within the scope of the present invention. It should be noted that the present invention may employ any number of conventional techniques for processing steps such as a binary search, and the like. Such general techniques that may be known to those skilled in the art are not described in detail herein.

It should be appreciated that the particular implementations and processes shown and described herein are illustrative of the present invention and its best mode and are not intended to otherwise limit the scope of the present invention in any way. Indeed, for the sake of brevity, conventional object-oriented programming and other software programming techniques may not be described in detail herein.

The present invention relates to methods and apparatus used to facilitate the sharing of implementations of common software algorithms among software components that operate on different types of data. Although the present invention may be used in conjunction with the sharing of a variety of different types of software such as sorting software, communication software and the like that operate on different data types, the present invention is conveniently described below in connection with rendering operations for computer graphics. Rendering operations may include such operations as drawing lines, drawing polylines, drawing filled polygons, drawing images, alpha compositions, and the like.

Figure 2:
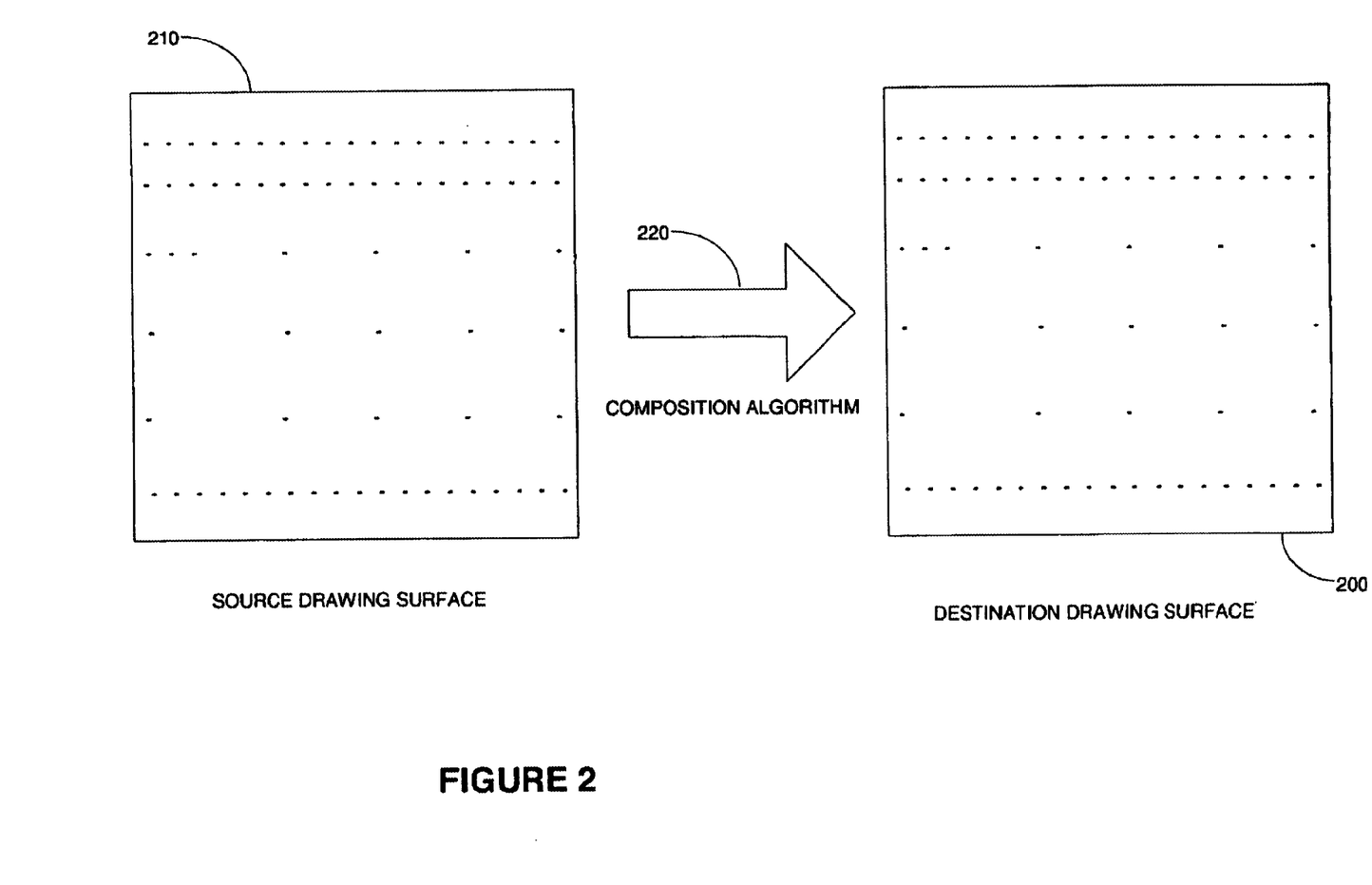
FIG. 2 illustrates a schematic diagram of an exemplary computer graphics operation in accordance with one aspect of the present invention.

Referring momentarily to FIG. 2, rendering operations are used to render (e.g., draw) graphics on a destination drawing surface 200 such as a computer screen, a pixel map in computer memory, a graphics file on the hard drive, and the like. In accordance with one aspect of the present invention, rendering operations may also comprise combining pixels from a source drawing surface 210 with pixels on destination drawing surface 200 using a composition algorithm 220. Composition algorithm 220 may include algorithms such as XOR and various alpha composite algorithms such as those described by T. Porter and T. Duff, "Compositing Digital Images", SIGGRAPH 84, pp. 253–259, the entire contents of which are hereby incorporated herein by this reference. It should be appreciated that drawing surfaces 200 and 210 each have a pixel format that may be different. In addition, source drawing surface 210 may comprise pixels that are of a single color or calculated gradient. Thus, the attributes or description of an implementation of a rendering operation may include the destination drawing surface data type (e.g., pixel format), the source drawing surface data type (e.g., pixel format, color value, gradient value), and the type of composition algorithm employed to combine the pixels from the two drawing surfaces. It should be appreciated, however, that the attributes of a rendering operation implementation may include more or less attributes, for example, the attributes may suitably comprise only the destination drawing surface data type, wherein there is no combining of pixels from a source drawing surface.

Figure 1:
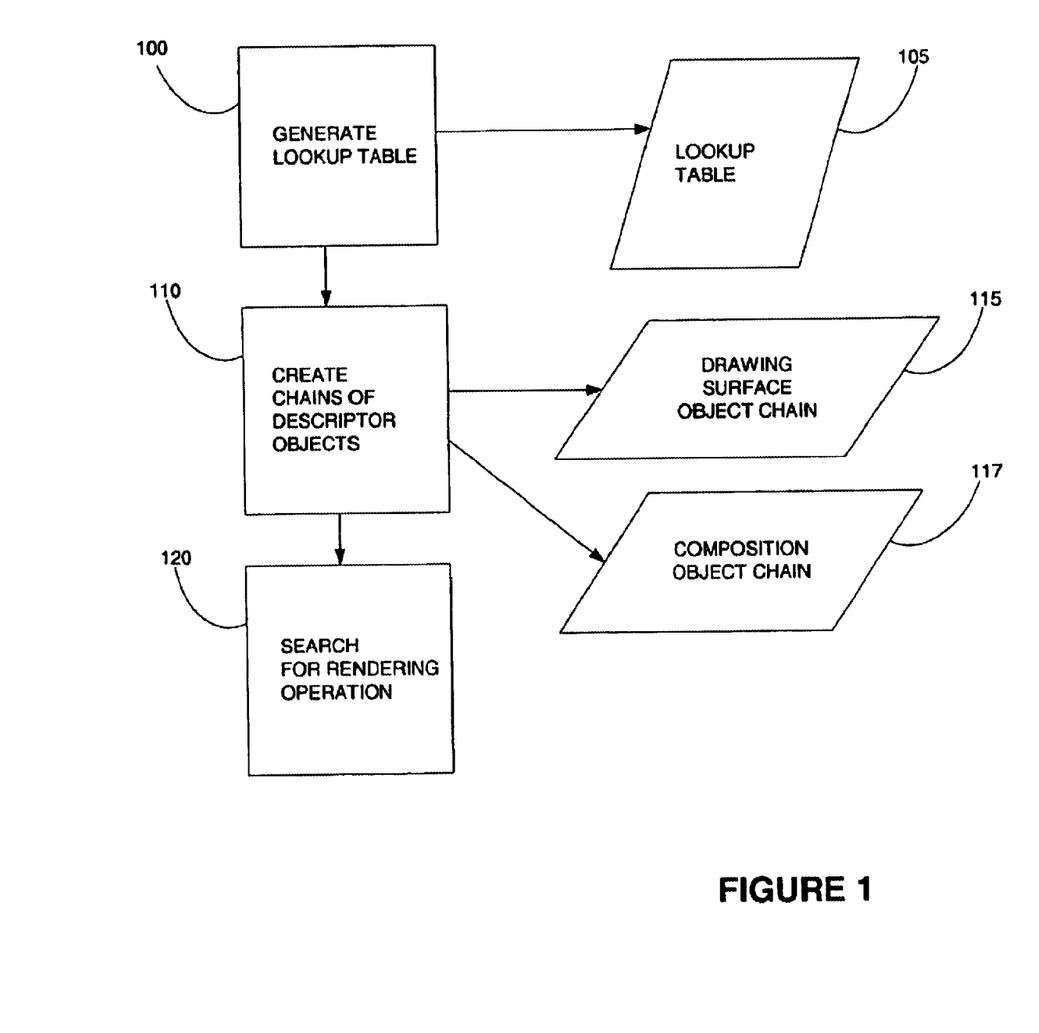
FIG. 1 illustrates a flow chart setting forth the operation of certain aspects of the present invention.
Figure 7:
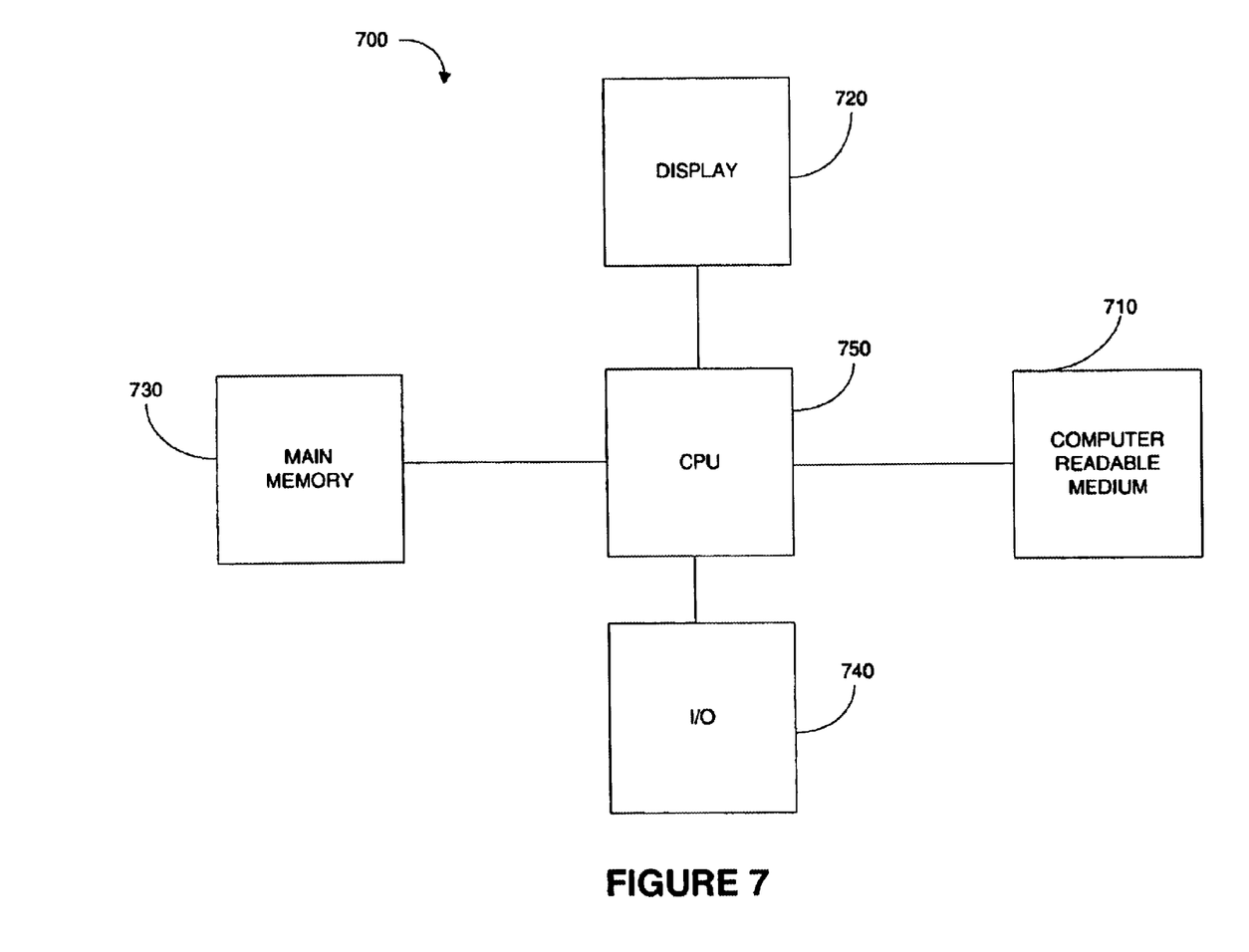
FIG. 7 illustrates a block diagram of a computer system used with an embodiment of the present invention.

FIG. 1 is a flow diagram that depicts the operation of one embodiment of the present invention. The technique shown in FIG. 1 can be implemented as computer software in the form of computer readable program code executed on a general purpose computer such as computer 700 illustrated in FIG. 7. A central processing unit (CPU) 750 is coupled to a computer readable medium device 710, a display 720, a main memory 730, and I/O unit 740. Display 720 may comprise various types of displays with different form factors, such as personal computer displays, mobile phone displays, laptop computer displays, and the displays of other consumer electronic and portable devices. I/O unit 740 represents such input/output devices as a keyboard, a mouse, a printer, A/V (audio/video) I/O, and the like. Computer readable medium device 710 represents devices for handling various forms of computer readable medium such as CDROM, DVD, diskettes, and the like. Processor 750 is a processor with a sufficient amount of processing power to execute a software program that embodies the technique summarized in FIG. 1. As discussed in greater detail below, the technique summarized in FIG. 1 generates a rendering operation lookup table 105, a drawing surface object chain 115, and a composition object chain 117 that can be used to store the attributes of implementations of rendering operations and to facilitate the sharing of those implementations among software components operating on different pixel formats. Lookup table generator 100 is preferably configured to generate lookup table 105 which stores the attributes of various implementations of rendering operations. Descriptor chain generator 110 is preferably configured to generate a drawing surface object chain 115 and a composition object chain 117. The characteristics and functions of lookup table generator 100, lookup table 105, descriptor chain generator 110, and object chains 115 and 117 are described in more detail below.

Figure 3:
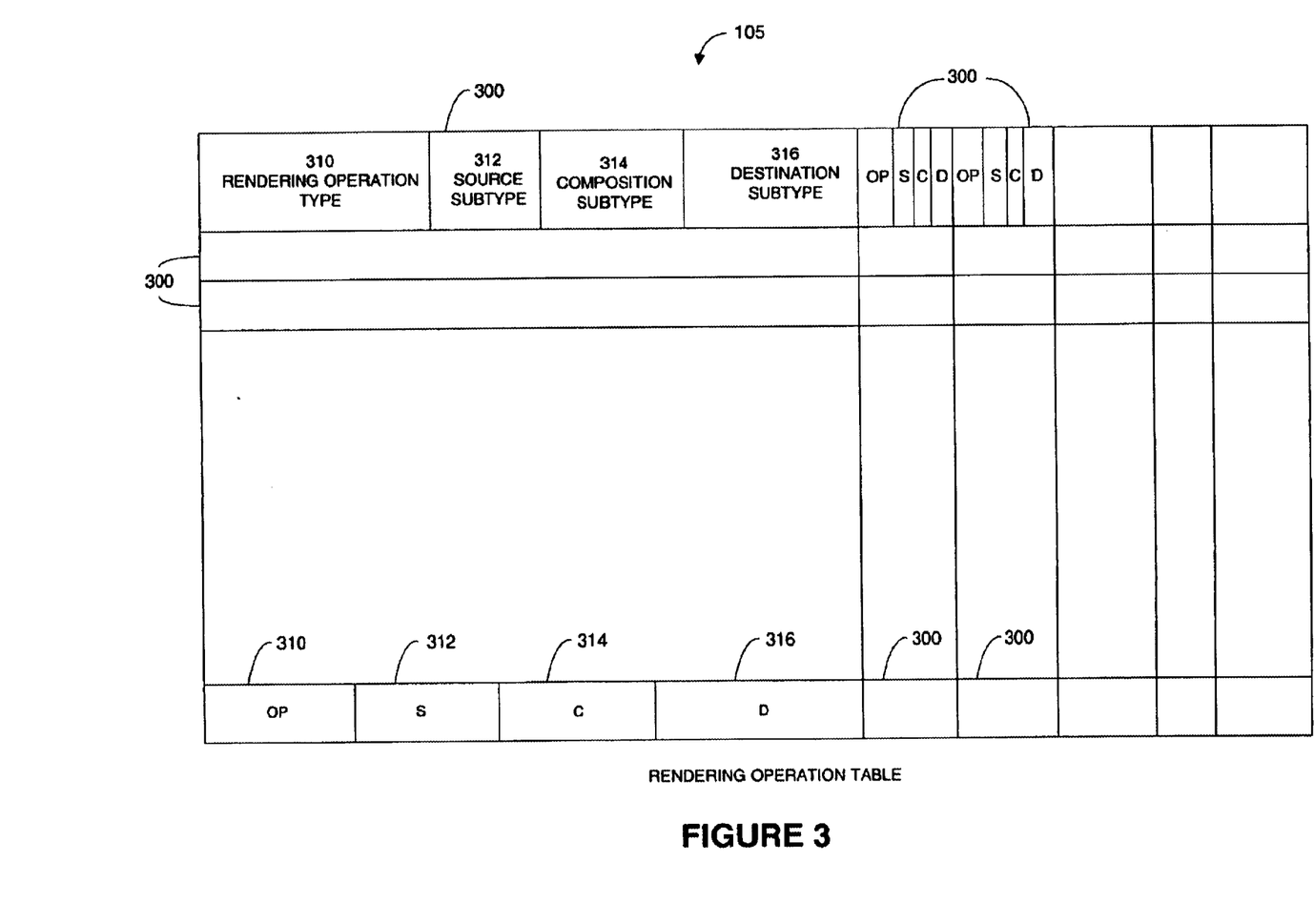
FIG. 3 illustrates a schematic diagram of a rendering operation lookup table in accordance with the present invention.

Lookup table generator 100 is preferably configured as a software program that stores the attributes of various implementations of rendering operations in lookup table 105. The lookup table can be provided in a spreadsheet format, a comma-separated value format, or any other suitable database format. With reference now to FIG. 3, an exemplary lookup table 105 is set forth. Such a lookup table is preferably configured to store, inter alia, attributes for a plurality of rendering operations. Lookup table 105 suitably comprises a plurality of memory sectors 300 each corresponding to a description of an implementation of one of the rendering operations. As discussed below, various attributes for the implementations of the rendering operations are suitably stored and retrieved in memory sectors 300.

More particularly, in accordance with a preferred embodiment of the present invention, memory sectors 300 store attributes that correspond to the rendering operation type (i.e., FillRect, Draw Image, Draw Line, etc.), the destination drawing surface data type, the source drawing surface data type, and the composition algorithm for each implementation of a rendering operation. With continued reference to FIG. 3, fields 310–316 may be used to store the attributes for each memory sector 300. The rendering operation type may be suitably stored in field 310. The source data type may be suitably stored in field 312. The composition type may be suitably stored in field 314, and the destination data type may be suitably stored in field 316. In order to facilitate the sharing of an implementation of a rendering operation among as many different pixel types as possible, the most general type will preferably be used for source data type, composition type, and destination data type. For example, if the implementation would work for any pixel format that use integer values for each pixel, then the source and destination data type should be set to "AnyInt" instead of, for example, "IntRGB". As discussed above, the source data type may be a pixel format, a color value, a gradient value, or the like. Furthermore, it will be appreciated that the source data type and/or the composition type may be NULL if the pixels of the source drawing surface are not combined with the pixels of the destination drawing surface.

In accordance with a further aspect of the present invention, the destination data type may be a pixel format or an API indicator for an alternate commercially available graphics package such as X11, GDI, and OpenGL and the like. The presence of an API indicator would indicate that the particular implementation of a rendering operation can render to any destination drawing surface that is managed by the specified graphics package, in which case, the rendering operation implementation would use function calls to instruct the alternate graphics engine to perform the rendering onto the destination drawing surface.

Referring back to FIG. 1, descriptor chain generator 110 is preferably configured as a software program to generate drawing surface object chain 115 and composition object chain 117. Drawing surface object chain 115 comprises a chain of a plurality of drawing surface objects that are linked together using pointers or other suitable techniques as will be explained in detail below. A drawing surface object provides, inter alia, a descriptor which is a description of a drawing surface data type. In accordance with various aspects of the present invention, a more specific description of a drawing surface is considered a "subtype", and a more general description of a drawing surface is considered a "supertype". For example, a representative drawing surface descriptor is "ByteIndexedColor" which may be used to describe a drawing surface that has a byte (i.e., 8-bits) value that represents an indexed color for each pixel. A representative supertype (i.e., more general descriptor) for ByteIndexedColor may be "AnyByte" which is a descriptor that may be used to describe a drawing surface that has a single byte value for each pixel. A representative subtype (i.e., more specific descriptor) for ByteIndexedColor may be "OpaqueByteIndexedColor" which describes a drawing surface with a byte value that represents an opaque indexed color for each pixel.

It should be appreciated, however, that the supertype may be considered a "second choice" description instead of a more general description. For example, in some systems, X11 (i.e., X-Windows) may be preferred to the direct access to pixels (represented by the Xrgb descriptor). Xrgb could be the supertype of X11 for a drawing surface in such a system. For another system, direct access may be preferable to X11, and therefore X11 would be the supertype of Xrgb in such a system. As will be explained below, this will, inter alia, ensure that the rendering operation implementation for the more desired subtype will be found, if it exists, before the rendering operation implementation for the "second choice" supertype is found.

Figure 4A:
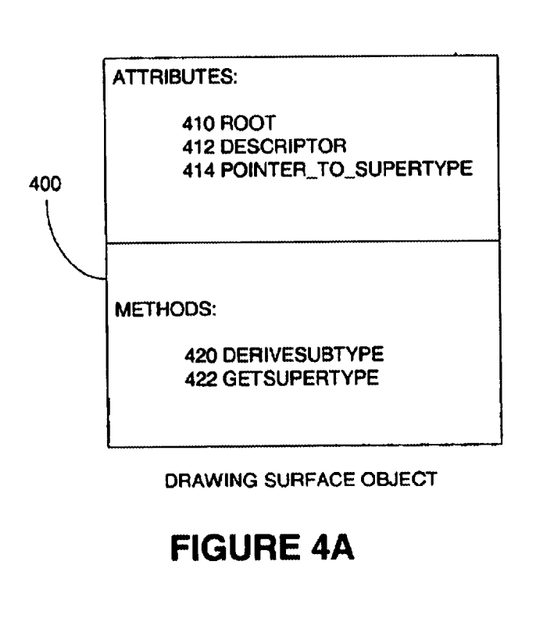
FIG. 4A illustrates a schematic diagram of an exemplary drawing surface object in accordance with the present invention.

With reference now to FIG. 4A, an exemplary drawing surface object 400 is depicted with a representative set of attributes and methods. In a preferred embodiment, the drawing surface object may be implemented in an object-oriented language that supports inheritance such as Java or C++. Drawing surface object 400 has attributes for, inter alia, a root 410, a descriptor 412, and a pointer_to_ supertype 414. Root 410 may typically be a global value for object chain 115 and root 410 can be used as the root object for the object chain. Typically, there will be only one root for any object chain 115 in a given system, however, it is possible to have no root or alternatively, more than one root for an object chain. Descriptor 412 may be a character string, or the equivalent, that is used to provide a description of a drawing surface as described above. Pointer_To_ SuperType 414 may be a pointer to the supertype for object 400 so that the more general drawing surface descriptor for object 400 may be accessed.

The following characteristics of chains and root objects should be noted. These characteristics apply to the various types of chains that are described herein. A chain is defined by an object and the other objects accessible via its supertype reference. Each chain may have zero, one, or more than one root. A given system can have multiple chains (e.g., a system can have many surfaces and each surface can be tagged with the same chain or a different chain). Independent from the number of roots where a particular chain may end, there may be a common root object or descriptor where all chains end. If every object in a chain has a single supertype pointer or reference, then that chain will end in a single root object if there are no loops in the chain. If one object in a chain has a supertype pointer that points to an object that was traversed earlier in the chain, then that chain will have no root unless there was a branch in the chain where an object has multiple supertypes. If an object has multiple supertype pointers, then a chain that contains this object might end in more than one root. Stated another way, the chain will split at each object that has more than one supertype, and the chain will head in two or more directions each of which can end in a different root or in a loop.

With reference back to FIG. 4, drawing surface object 400 also has methods, inter alia, for deriving a subtype and for getting a supertype. Method 420 may be used to derive or create a new subtype for drawing surface object 400 whereby the new subtype is another drawing surface object for a more specific drawing surface descriptor with drawing surface object 400 as its parent or supertype as described above. Method 422 may be used to obtain the supertype for drawing surface object 400 whereby the supertype is another drawing surface object for a more general drawing surface descriptor which describes the same surface as described above. The operation of drawing surface object 400 will be described in more detail below.

With reference back to FIG. 1, composition object chain 117 comprises a chain of a plurality of composition objects that are linked together using pointers or other suitable techniques. A composition object provides, inter alia, a descriptor which is a description of a type of algorithm for color compositing a source pixel or color with a destination pixel or color as described above. In accordance with various aspects of the present invention, a more specific description of a composition algorithm is considered a "subtype", and a more general description of a composition algorithm is considered a "supertype". However, it should be appreciated that a supertype may be a second choice composition algorithm. For example, a representative composition descriptor is "SrcOver" which may be used to describe a composition algorithm such as the well-known Porter-Duff source over destination algorithm whereby the source pixel overwrites the destination pixel using the alpha information (i.e., amount of transparency) of the two pixels. A representative supertype for SrcOver may be "AnyAlpha" which is a descriptor that may be used to describe a composition algorithm that is any of the well-known Porter-Duff alpha compositions. A representative subtype for SrcOver may be "SrcOverNoEa" which may be used to describe a composition algorithm such as the Porter-Duff source over destination algorithm where there is no extra alpha information applied.

Figure 4B:
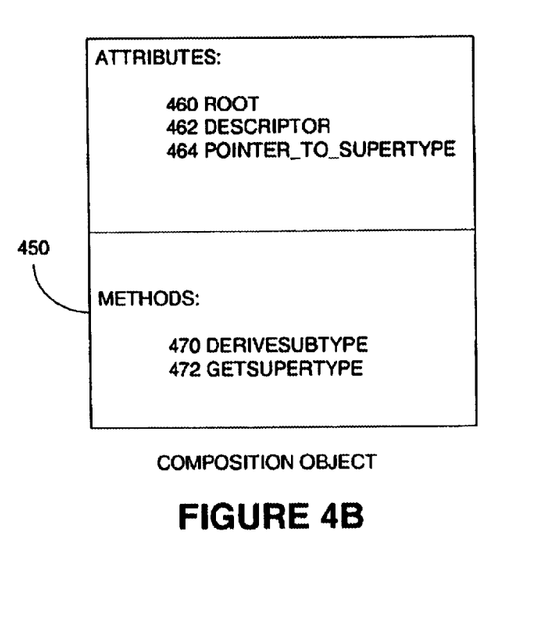
FIG. 4B illustrates a schematic diagram of an exemplary composition object in accordance with the present invention.

With reference now to FIG. 4B, an exemplary composition object 450 is depicted with a representative set of attributes and methods. Similar to the drawing surface object, in a preferred embodiment; the composition object may be implemented in an object-oriented language that supports inheritance such as Java or C++. Composition object 450 has attributes for, inter alia, a root 460, a descriptor 462, and a pointer_to_supertype 464. Root 460 may typically be a global value for object chain 117 and root 460 can be used as the root object for the object chain. Typically, there will be only one root for any object chain 117. However, it should be appreciated that object chain 117 may have zero roots, or more than one root. Descriptor 462 may be a character string, or the equivalent, that is used to provide a description of a composition algorithm as described above. Pointer_To_SuperType 464 may be a pointer to the supertype for object 450 so that the more general composition descriptor for object 450 may be accessed.

In addition, composition object 450 has methods, inter alia, for deriving a subtype and for getting a supertype. Method 470 may be used to derive or generate a new subtype for composition object 450 whereby the new subtype is another composition object for a more specific composition descriptor with composition object 450 as its supertype as described above. Method 472 may be used to obtain the supertype for composition object 450 whereby the supertype is another composition object for a more general composition descriptor for the same pixel combination operation as described above. The operation of composition object 450 and drawing surface object 400 will be described next.

Figure 5:
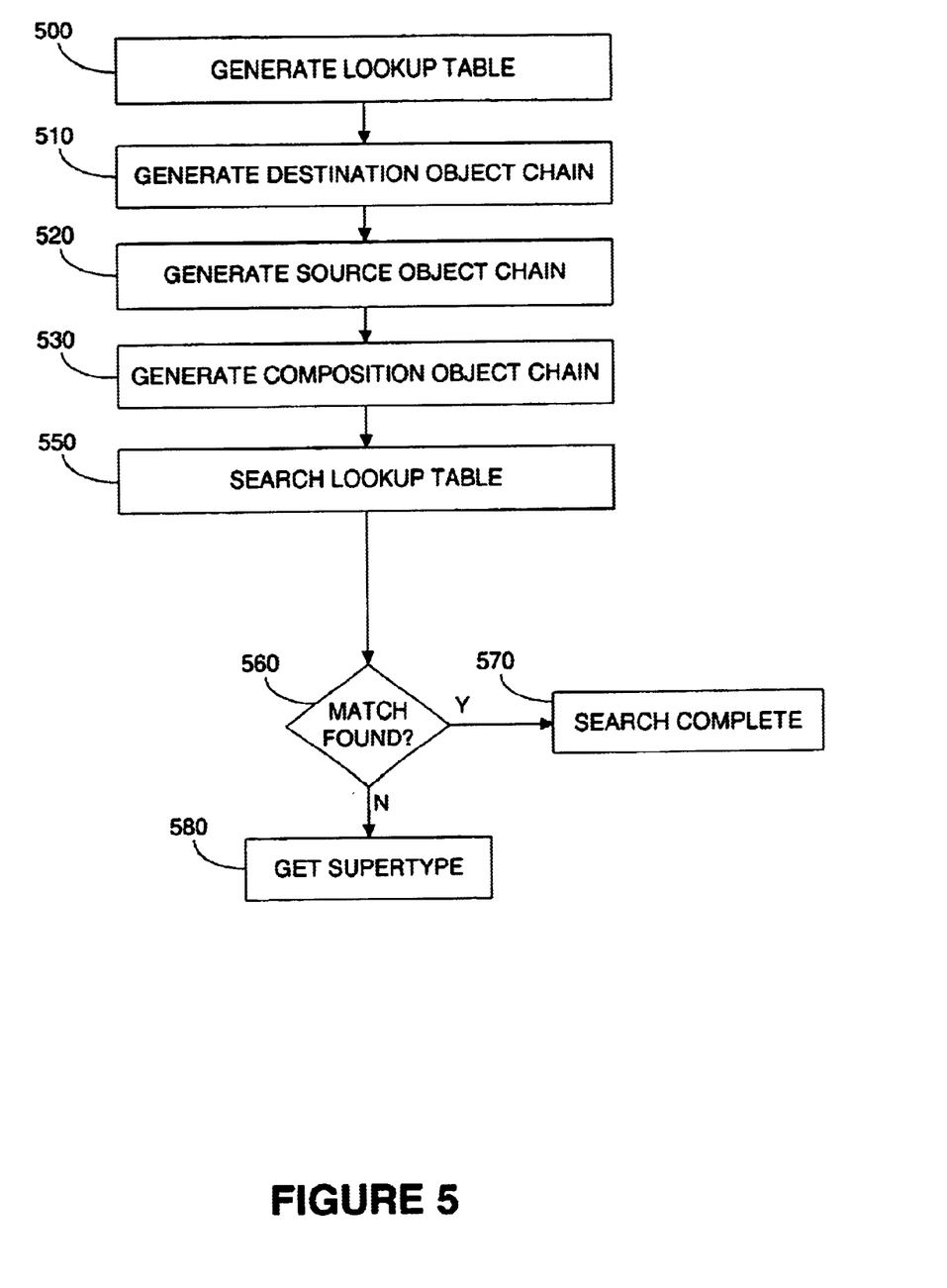
FIG. 5 illustrates a flow chart setting forth the operation of certain aspects of the present invention.

With reference to FIG. 5, rendering operation lookup table 105 is generated by lookup table generator 100 (Step 500). As described above, lookup table generator 100 is preferably configured as a software program. A variety of well-known software techniques may be used to generate lookup table 105 and generator 100 may be suitably configured to work in a number of different fashions. For example, generator 100 may build the entire lookup table each time that it is invoked, or generator 100 may incrementally add to the lookup table as a new rendering operation is implemented. The lookup table may be generated off-line, or it may be generated each time it is necessary to check for a particular implementation of a rendering operation.

Figures 6A, 6B:
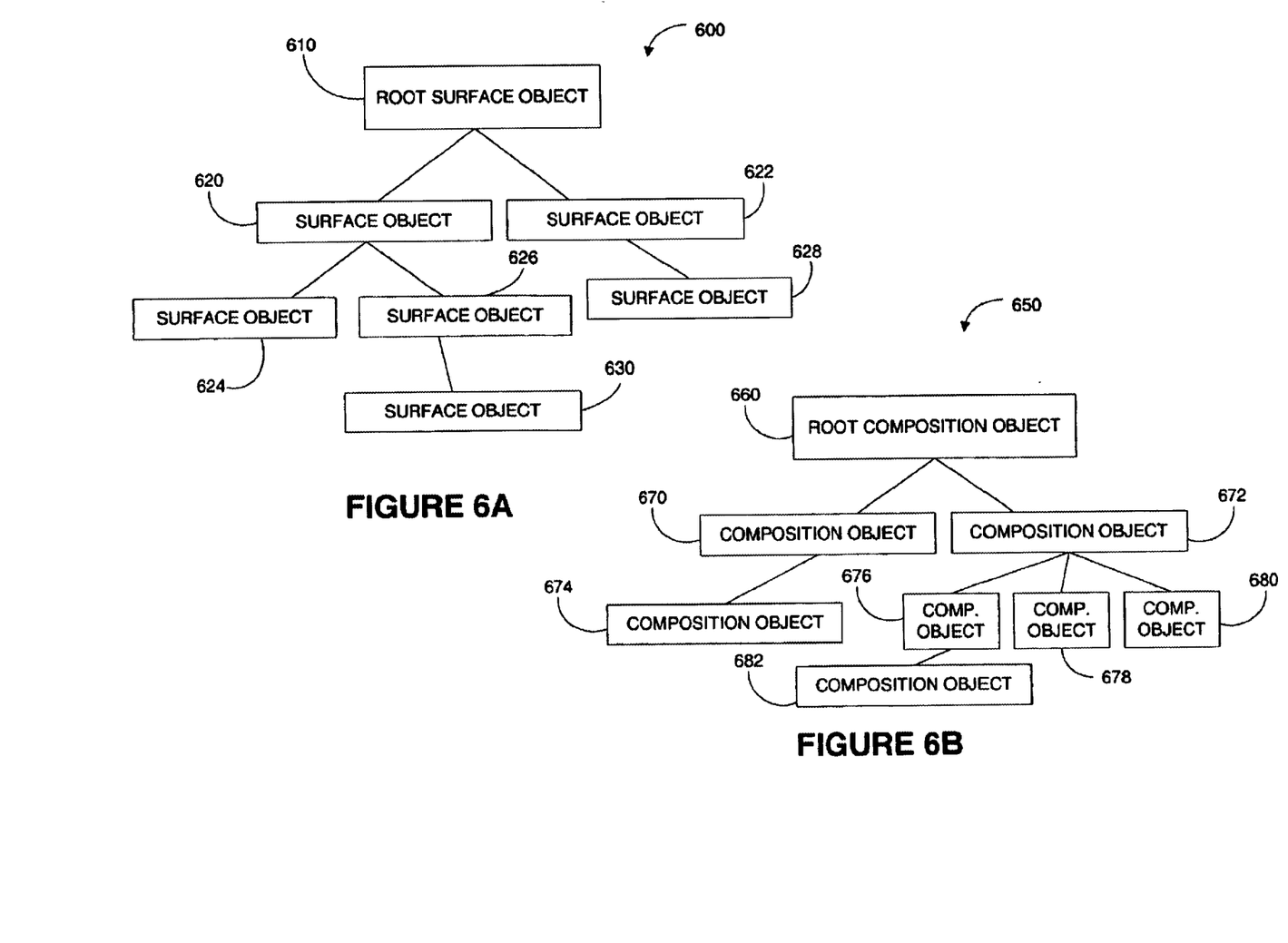
FIG. 6A illustrates a schematic diagram of an exemplary drawing surface object chain in accordance with the present invention.
FIG. 6B illustrates a schematic diagram of an exemplary composition object chain in accordance with the present invention.

Descriptor chain generator 110 generates a chain of destination drawing surface objects (step 510), and if necessary, generator 110 may also generate a chain of source drawing surface objects (step 520) and a chain of composite objects (step 530). Referring now to FIG. 6A, an exemplary chain 600 of drawing surface objects is illustrated that suitably comprises a root surface object 610 and a plurality of drawing surface objects 620–628. The representative number of surface objects is for exemplary purposes only, and it should be appreciated that the actual number of surface objects in a chain of surface objects can vary greatly.

With continued reference to FIG. 6A, root surface object 610 as illustrated, has two subtypes, surface objects 620 and 622, and the supertype of both surface object 620 and 622 is root surface object 610. Similarly, surface object 620 has two subtypes, surface objects 624 and 626, and surface object 622 has one subtype, surface object 628. The surface objects may be linked together using pointer 414 which points to another surface object, typically a more general surface object (i.e., supertype) for ease of traversal of the chain as will be described below. The source surface object chain and the destination surface object chain may comprise the same chain, or there may be a separate chain for the source and drawing surfaces. In accordance with various aspects of the present invention, chain generator 110 may generate the object chains using method 420 for deriving subtypes for the surface objects.

With reference now to FIG. 6B, an exemplary composition object chain 650 is illustrated. Similar to surface object chain 600, composition object chain 650 has a root object 660, and composition object subtypes 670–682. Chain generator 110 may generate composition object chain 650 in a similar manner as surface object chain 600 is constructed.

Referring back to FIG. 5, after the object chains are generated, a suitable rendering operation implementation for a specific combination of destination drawing data type, source data type, and composition type may now be identified in the following manner. Alternatively, as noted above, the specific combination may only involve a destination drawing data type, or a source and destination drawing type.

Lookup table 105 may now be searched in an iterative manner (step 550) in order to find an implementation for a particular rendering operation. In accordance with a preferred embodiment, the most specific combination of destination, source and composition are used for a first traversal of lookup table 105. Stated another way, the most specific subtypes that correspond to the specified source drawing type, the specified destination drawing type, and the specified composition are used to traverse the lookup table in order to find a match for the specified rendering operation. Lookup table 105 may be traversed in any number of ways that are well known in the art. For example, a binary search algorithm may be used to search the lookup table. Alternatively, any of a number of other well known search techniques, including a brute force search, may be used. If a match is found (step 560) for the specified combination of rendering operation, source drawing surface, destination drawing surface, and composition technique then the search is over and the implementation of the rendering operation is identified and can now be utilized (step 570).

However, if a match is not found, then a supertype for one of the specified source, destination, or composition types may be retrieved (step 580) by traversing up one of the chains for the source, destination, or composition objects, and lookup table 105 may be again searched with the new combination (step 550) that includes the descriptor for the just retrieved supertype. The chains for the source, destination, and composition objects may be traversed in any number of ways. For example, the entire composition object chain could be traversed first, one object at a time, until the root composition object is reached (e.g., supertype pointer is NULL). If there is still no match for a rendering operation, then the search could continue by next traversing up either the destination or source object chains. Pseudo code for such a chain traversal would resemble the following nested for loops:

```
for (destination_type = specified destination type; while
destination_type != NULL;
destination_type = destination_type.getSuperType) {
    for (source_type = specified source type; while
    source_type != NULL;
    source_type = source_type.getSuperType) {
        for (composition_type = specified composition type;
        while composition_type != NULL; composition_type =
        composition_type.getSuperType) {
            search_lookup_table;
            if (match_found) then
            return; // We have found rendering operation
            implementation
        }
    }
}
```

It should be appreciated that the order in which the chains are traversed is arbitrary, as the composite object chain is traversed most quickly (the innermost loop). Instead, the source or destination object chains could be traversed most quickly.

Alternatively, the chains could be traversed evenly, in that the source, destination and composition object chains are traversed in a "non-nested" manner so that each chain is traversed one level, before any chain is traversed another level.

It should also be appreciated that the inheritance of the surface objects and composition objects is dynamic. For example, each destination drawing surface could be tagged with a unique inheritance chain of descriptors where the ordering and presence of various specific descriptors in the chain is unrelated to the order and appearance of specific descriptors in other similar chains attached to other drawing surfaces. For example, one chain could list both "X11" and "Xrgb" in its chain of descriptors when the drawing surface can be drawn to by either using the X11 graphics protocol or by manipulating pixels in the Xrgb format directly. Another destination drawing surface may only include X11 in its chain if there is no direct access to the pixels of the drawing surface. A third destination drawing surface might only list Xrgb if its pixels are stored in the Xrgb format and there is no access to the drawing surface through the X11 protocol. In addition, it is possible that the chain for a particular surface may change over time. For example, some external changes in the system might occur that could make direct access to the pixels available or unavailable. As these changes occur, the chain associated with a particular surface might change to include or exclude the descriptor objects that require direct access to the pixels. Thus, the inheritance chain of surface and composite objects is fully customizable and dynamic, unlike ordinary object oriented inheritance.

The present invention has been described above with reference to a preferred embodiment. However, those skilled in the art will recognize that changes and modifications may be made to the disclosed embodiments without departing from the scope of the present invention. For example, the various processing steps of forming the surface object and composition object chains may be implemented in alternate ways depending upon the particular application or in consideration of any number of cost functions associated with the operation of the system. In addition, the techniques described herein may be extended or modified for use with various other applications, such as, for example, a file transfer application operating on files of different data formats. These and other changes or modifications are intended to be included within the scope of the present invention.

What is claimed is:

1. In a computer system, a method of characterizing graphics data types and software algorithm implementations comprising the steps of:

generating a lookup table having a plurality of software algorithm implementation descriptions, wherein each description comprises at least one attribute; and generating a chain of a plurality of objects, wherein the objects correspond to at least one of the attributes of the software algorithm implementation description, wherein at least one of the objects has a supertype that corresponds to another object in the chain, and wherein at least one of the objects has a subtype that corresponds to another object in the chain, wherein the subtype is connected to the supertype by the chain, wherein the supertype is a more general description of a composition algorithm, wherein the subtype is a more specific description of a composition algorithm, and wherein the chain is defined by the plurality of objects accessible by the supertype, wherein the lookup table and the chain of the plurality of objects are generated dynamically, wherein the lookup table is searched for a rendering operation implementation that best matches a specified criteria.

2. The method of claim 1, wherein in the step of generating a lookup table, the lookup table comprises a rendering operation lookup table having a plurality of rendering operation implementation descriptions, wherein each description comprises at least one attribute.

3. The method of claim 2, wherein:

in the step of generating a lookup table, each of the descriptions comprises a plurality of attributes, wherein at least one attribute comprises a destination drawing surface data type and at least one attribute comprises a rendering operation type; and in the step of generating a chain of objects, the objects comprise destination drawing surface objects.

4. The method of claim 3, wherein in the step of generating a lookup table, the destination drawing surface data type comprises an API indicator for a commercially available graphics package.

5. The method of claim 3 further comprising the step of:

generating a chain of source drawing surface objects, the chain having a plurality of surface objects; and wherein in the step of generating a lookup table, each of the rendering operation implementation descriptions further comprises a source drawing surface data type.

6. The method of claim 5 further comprising the step of:
generating a chain of a plurality of composition objects; and
wherein in the step of generating a lookup table, each of the rendering operation implementation descriptions further comprises a composition algorithm type.

7. In a computer system, a method for facilitating the sharing of software algorithm implementations, the method comprising the steps of:
generating a lookup table having a plurality of software algorithm implementation descriptions, wherein each description comprises at least one attribute;
generating a chain of a plurality of objects, wherein the chain has a root object and the objects correspond to at least one of the attributes of the software algorithm implementation description, wherein at least one of the objects has a supertype that corresponds to another object in the chain, and wherein at least one of the objects has a subtype that corresponds to another object in the chain, wherein the subtype is connected to the supertype by the chain, wherein the supertype is a more general description of a composition algorithm, wherein the subtype is a more specific description of a composition algorithm, and wherein the chain is defined by the plurality of objects accessible by the supertype, wherein the lookup table and the chain of the plurality of objects are generated dynamically; and
searching the lookup table for the description having a specified attribute and for a rendering operation implementation that best matches the specified attribute.

8. The method of claim 7 further comprising the steps of:
traversing the chain of objects to obtain the supertype of the specified attribute;
searching the lookup table for the description having the attribute that matches the supertype; and
repeating the traversing and searching steps until the description is found or the chain is traversed.

9. The method of claim 8, wherein the step of generating a lookup table is performed only when a new software algorithm implementation description is inserted into the lookup table.

10. The method of claim 8, wherein the step of generating a lookup table is performed each time the step of searching the lookup table is performed.

11. The method of claim 8, wherein in the step of generating a lookup table, the lookup table comprises a rendering operation lookup table having a plurality of rendering operation descriptions, wherein each description comprises at least one attribute.

12. The method of claim 11, wherein:
in the step of generating a lookup table, each of the descriptions comprises a plurality of attributes, wherein at least one attribute comprises a destination drawing surface data type and at least one attribute comprises a rendering operation type;
in the step of generating a chain of objects, the objects comprise destination drawing surface data type.

13. The method of claim 12, wherein in the step of generating a lookup table, the destination drawing surface data type comprises an API indicating for a commercially available graphics package.

14. The method of claim 12, wherein the step of searching comprises searching the lookup table for the description that matches a specified destination drawing surface data type for a specified rendering operation type.

15. The method of claim 12, further comprising the step of:
generating a chain of course drawing surface objects, the chain having a root surface object and a plurality of surface objects; and
wherein:
in the step of generating a lookup table, each of the rendering operation implementation descriptions further comprises a source drawing surface data type; and
the step of traversing comprises backing up one of (a) the chain of the destination drawing surface objects and (b) the chain of the source drawing surface object.

16. The method of claim 15, wherein the step of searching comprises searching the lookup table for the description that matches a specified destination drawing surface data type and a specified source drawing surface data type for a specified rendering operation type.

17. The method of claim 15, further comprising the step of:
generating a chain of composition objects, the chain having a root composition object and a plurality of composition objects; and
wherein:
in the step of generating a lookup table, each of the rendering operation implementation descriptions further comprises a composition algorithm type; and
the step of traversing comprises backing up one of (a) the chain of destination drawing surface objects, (b) the chain of source drawing surface object and (c) the chain of composition objects.

18. The method of claim 17, wherein the step of searching comprises searching the lookup table for the description that matches a specified destination drawing surface data type, a specified source drawing surface data type, and a specified composition algorithm for a specified rendering operation type.

19. A computer system for facilitating the sharing of rendering operation implementations, the computer system comprising:
a processor;
a lookup table having a plurality of memory sectors coupled to the processor, wherein each memory sector corresponds to a rendering operation implementation description, the memory sector comprising a rendering operation type and a destination drawing surface data type; and
program code executed by the processor, the program code comprising a chain of destination drawing surface objects, the chain having a root destination drawing surface object, wherein at least one of the objects has a supertype that corresponds to another object in the chain, and wherein at least one of the objects has a subtype that corresponds to another object in the chain, wherein the subtype is connected to the supertype by the chain, wherein the supertype is a more general description of a composition algorithm, wherein the subtype is a more specific description of a composition algorithm, and wherein the chain is defined by the plurality of objects accessible by the supertype, wherein the lookup table and the chain of the plurality of objects are generated dynamically, wherein the lookup table is searched for a rendering operation implementation that best matches a specified criteria.

20. The computer system of claim 19, wherein the destination drawing surface data type comprises an API indicator for a commercially available graphics package.

21. The computer system of claim 19 wherein:

each memory sector of the lookup table further comprises a source drawing surface data type; and the program code further comprises a chain of source drawing surface objects, the chain having a root source drawing surface object.

22. The computer system of claim 21 wherein:

each memory sector of the lookup table further comprises a composition algorithm type; and the program code further comprises a chain of composition objects, the chain having a root composition object.

23. A computer program product comprising:

a computer readable medium having computer readable program code embodied therein that handles facilitating the sharing of software algorithm implementations, the computer program product comprising:

computer readable program code configured to cause a computer to generate a lookup table having a plurality of software algorithm implementation descriptions, wherein each description comprises at least one attribute;

computer readable program code configured to cause a computer to generate a chain of a plurality of objects, wherein the objects correspond to at least one of the attributes of the software algorithm implementation description, wherein at least one of the objects has a supertype that corresponds to another object in the chain, and wherein at least one of the objects has a subtype that corresponds to another object in the chain, wherein the subtype is connected to the supertype by the chain, wherein the supertype is a more general description of a composition algorithm, wherein the subtype is a more specific description of a composition algorithm, and wherein the chain is defined by the plurality of objects accessible by the supertype, wherein the lookup table and the chain of the plurality of objects are generated dynamically; and computer readable program code configured to cause a computer to search the lookup table for the description having a specified attribute and for a rendering operation implementation that best matches the specified attribute.

24. The computer program product of claim 23 further comprising:

computer readable program code configured to cause a computer to traverse the chain of objects to obtain the supertype of the specified attribute;

computer readable program code configured to cause a computer to search the lookup table for the description having the attribute that matches the supertype; and computer readable program code configured to cause a computer to repeat traversing the chain of objects and searching the lookup table until the description is found or the chain is traversed.

25. The computer program product of claim 24, wherein the lookup table comprises a rendering operation lookup table having a plurality of rendering operation descriptions, wherein each description comprises at least one attribute.

26. The computer program product of claim 25, wherein:

each of the descriptions comprises a plurality of attributes wherein at least one attribute comprises a destination drawing surface data type and at least one attribute comprises rendering operation type;

the chain of objects comprise a plurality of destination drawing surface objects; and the specified attribute is a destination drawing surface data type.

27. The computer program product of claim 26, wherein the destination drawing surface data type comprises an API indicator for a commercially available graphics package.

28. The computer program product of claim 26, wherein the computer program code is further configured to cause a computer to search the lookup table for the description that matches a specified destination drawing surface data type for a specified rendering operation type.

29. The computer program product of claim 26, further comprising:

computer program code configured to cause a computer to generate a chain of source drawing surface objects, the chain having a root surface object and a plurality of surface objects; and each of the rendering operation implementation descriptions further comprises a source drawing surface data type.

30. The computer program product of claim 29, wherein the computer program code is further configured to cause a computer to search the lookup table for the description that matches a specified destination drawing surface data type and a specified source drawing surface data type for a specified rendering operation type.

31. The computer program product of claim 29, further comprising:

computer program code configured to generate a chain of composition objects, the chain having a root composition object and a plurality of composition objects; and each of the rendering operation implementation descriptions further comprises a composition algorithm type.

32. The computer program product of claim 31, wherein the computer program code is further configured to search the lookup table for the description that matches a specified destination drawing surface data type, a specified source drawing surface data type, and a specified composition algorithm for a specified rendering operation type.

* * * * *